US012798058B2

(12) United States Patent
Liao

(10) Patent No.: US 12,798,058 B2
(45) Date of Patent: Nov. 17, 2026

(54) WRENCH STRUCTURE

(71) Applicant: Chia-Kuan Liao, Taichung City (TW)

(72) Inventor: Chia-Kuan Liao, Taichung City (TW)

( * ) Notice: Subject to any disclaimer, the term of this patent is extended or adjusted under 35 U.S.C. 154(b) by 252 days.

(21) Appl. No.: 18/792,237

(22) Filed: Aug. 1, 2024

(65) Prior Publication Data

US 2026/0034644 A1 Feb. 5, 2026

(51) Int. Cl.
*B25B 13/46* (2006.01)
*B25B 23/00* (2006.01)

(52) U.S. Cl.
CPC ........ *B25B 13/463* (2013.01); *B25B 23/0035* (2013.01)

(58) Field of Classification Search
CPC .......................... B25B 13/468; B25B 23/0035
USPC ........................................................... 81/60
See application file for complete search history.

(56) References Cited

U.S. PATENT DOCUMENTS 8,943,929 B2 * 2/2015 Ou ........................ B25B 13/463 81/60
9,205,538 B2 * 12/2015 Yang ..................... B25B 13/461
9,308,631 B2 4/2016 Shyu
9,789,593 B2 * 10/2017 Kao ...................... B25B 13/463
10,744,623 B2 * 8/2020 Yang ..................... B25B 13/463
12,600,015 B2 * 4/2026 Lee ....................... B25B 13/468

* cited by examiner

*Primary Examiner* — Hadi Shakeri
(74) *Attorney, Agent, or Firm* — LANWAY IPR SERVICES; Chun-Ming Shih

(57) ABSTRACT

A wrench structure includes a first body unit, a second body, a third body, and an elastic member. The first body unit includes a first body and a control knob. The first body is provided with an operation end, a first pivot portion, a first end face, a second pivot portion, a second end face, two first slide guides, and a first receiving recess. The control knob is provided with a control portion movable on the second end face. The second body is provided with a first mounting portion. The third body is movable linearly on the first body to be close to or away from the second body. The third body is provided with two second slide guides movable linearly relative to the two first slide guides. The elastic member is elastically biased between the third body and the first receiving recess.

4 Claims, 16 Drawing Sheets

WRENCH STRUCTURE

BACKGROUND OF THE INVENTION

Field of the Invention

The present invention relates to a hand operated tool and, more particularly, to a wrench structure.

Description of the Related Art

A conventional wrench structure was disclosed in the U.S. Pat. No. 9,308,631, and comprises a wrench body 10, a snap plate 30, and a collar 40.

However, such a conventional wrench structure has the following disadvantages:

1. The snap plate 30 has a middle position provided with a long hole 32 for mounting a direction switching button 21. The snap plate 30 has an end provided with a push portion 33. Thus, the snap plate 30 needs to have a long length. The snap plate 30 is received in the ratchet acting head 11 so that the ratchet acting head 11 also needs to have a longer length for mounting the snap plate 30.
2. The snap plate 30 is a thin plate with a determined length and has to be provided with the snap portion 31 and the long hole 32. Thus, the snap plate 30 is easily deformed or bent upward during a long-term utilization so that the snap portion 31 cannot be locked smoothly.
3. The collar 40 is mounted on the wrench body 10. The wrench body 10 is provided with a screw hole 15 close to the ratchet acting head 11. The collar 40 is provided with a hole 42. A locking component 43 extends through the hole 42 of the collar 40 and is screwed into the screw hole 15 of the wrench body 10 to secure the collar 40 to the wrench body 10. The collar 40 is used to receive the elastic member 44 and push portion 33. Thus, the conventional wrench structure has a complicated construction with many parts, thereby increasing the cost of fabrication.

BRIEF SUMMARY OF THE INVENTION

The primary objective of the present invention is to provide a wrench structure with an operation end having a shorter length.

In accordance with the present invention, there is provided a wrench structure comprising a first body unit, a second body, a third body, and an elastic member. The first body unit includes a first body and a control knob. The first body is provided with an operation end, a first pivot portion, a first end face, a second pivot portion, a second end face, two first slide guides, and a first receiving recess. The control knob is provided with a control portion movable on the second end face. The second body is provided with a first mounting portion and a first limit portion. The third body is movable linearly on the first body to be close to or away from the second body. The third body is provided with a second limit portion. The third body is provided with two second slide guides movable linearly relative to the two first slide guides. The third body is provided with a first abutting face and an abutting portion. The elastic member is elastically biased between the third body and the first receiving recess.

According to the primary advantages of the present invention, the control knob is pivotally mounted on the second pivot portion. The third body is provided with two second slide guides movable linearly relative to the two first slide guides. The control knob is driven and moved on the second end face. The third body is moved on the first end face. The third body and the control knob are situated at different planes so that the third body is not interrupted by the control knob during displacement. Thus, the third body and the control knob are controlled and operated individually.

According to another advantage of the present invention, the second limit portion is restricted by the first limit portion, so that the second limit portion is moved in the first receiving recess and will not be detached from the first receiving recess. The two second slide guides are restricted by the two first slide guides, so that the third body slides on the first end face and will not be detached from the first end face.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
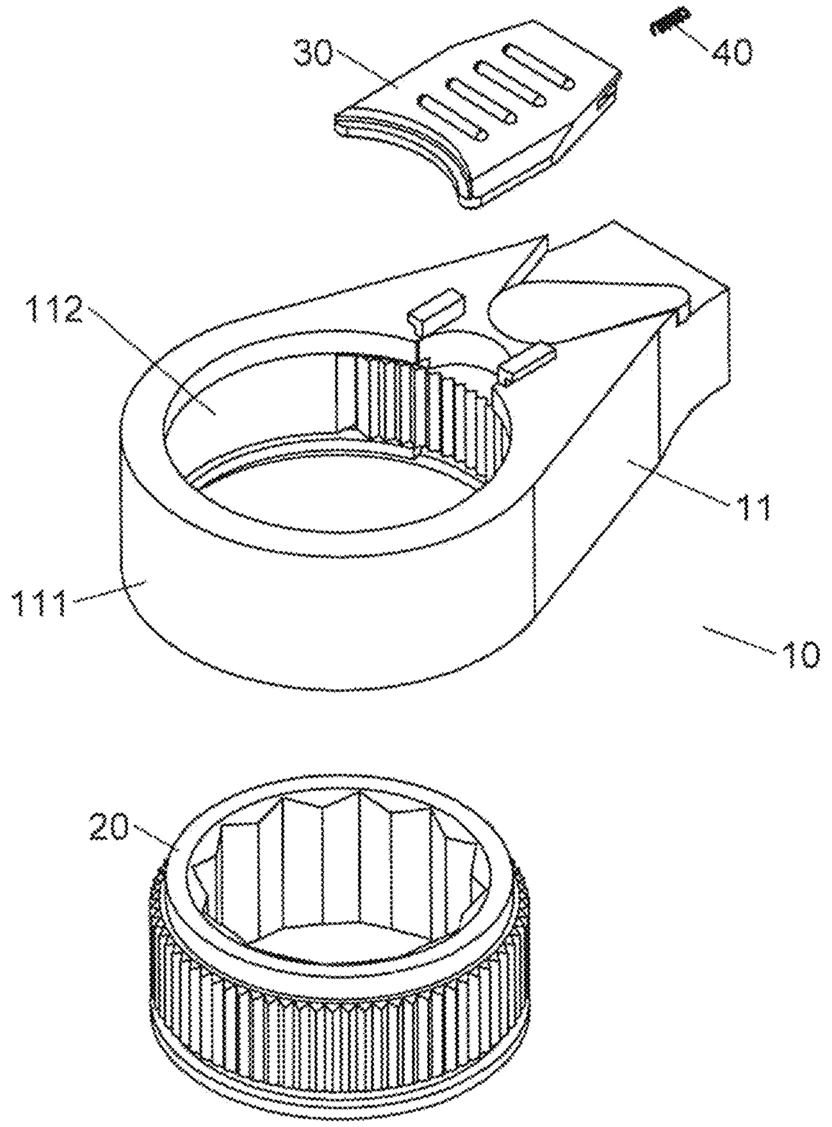
FIG. 1 is a partial exploded perspective view of a wrench structure in accordance with the preferred embodiment of the present invention.
Figure 2:
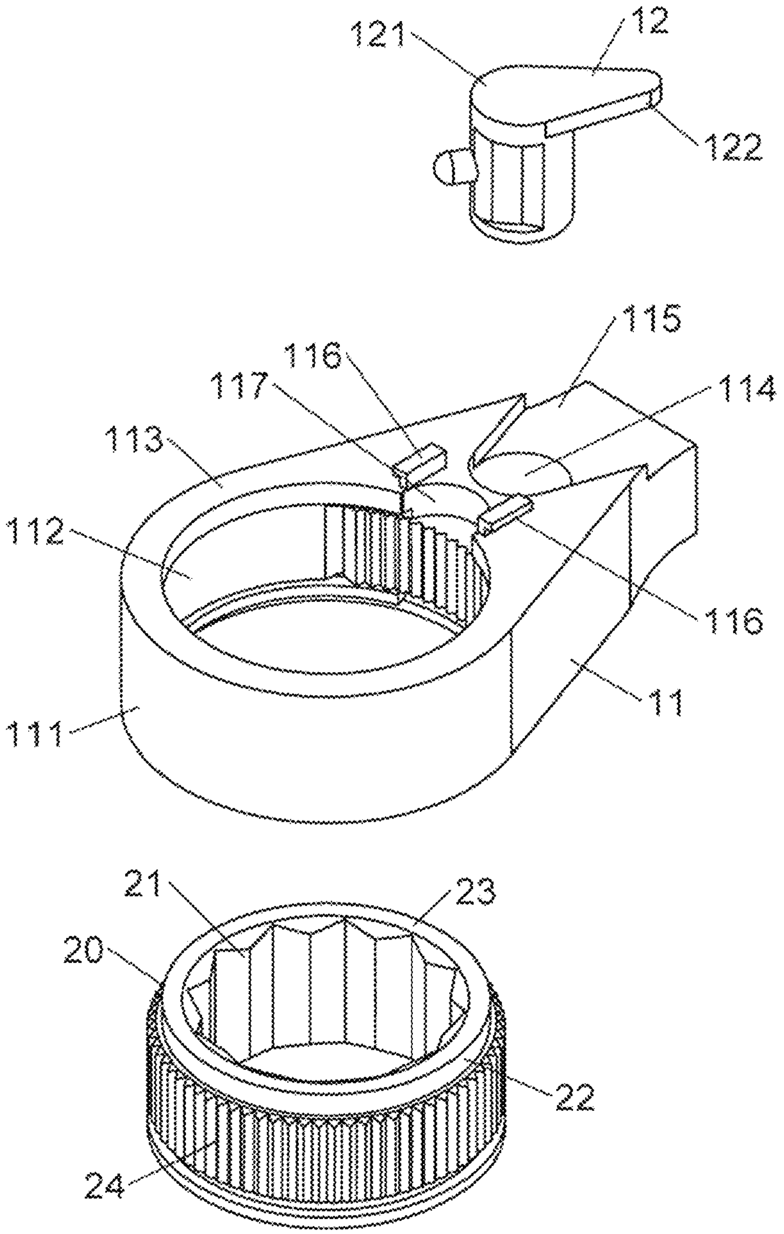
FIG. 2 is a partial exploded perspective view of the wrench structure in accordance with the preferred embodiment of the present invention.
Figure 4:
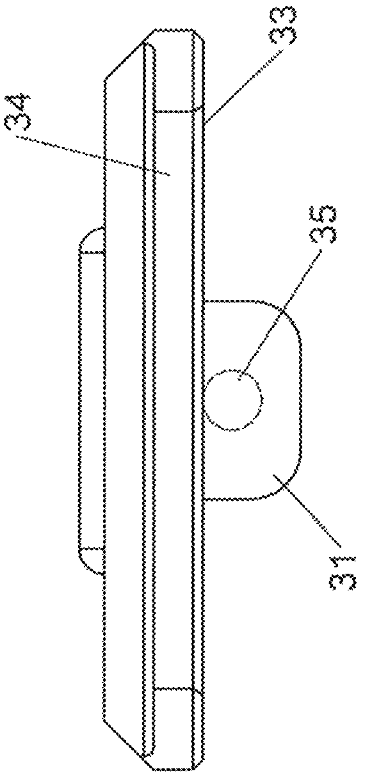
FIG. 4 is a front view of the third body of the wrench structure as shown in FIG. 3.
Figure 3:
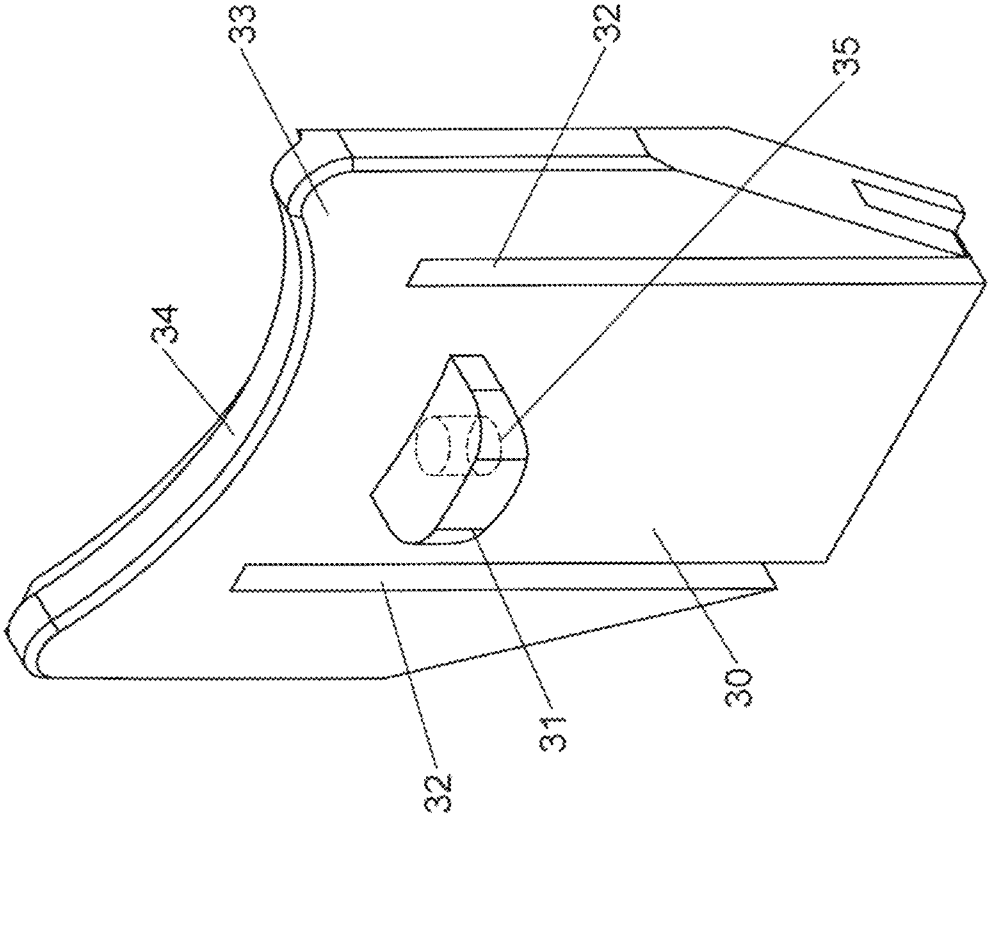
FIG. 3 is a perspective view of a third body of the wrench structure in accordance with the preferred embodiment of the present invention.

Referring to the drawings and initially to FIGS. 1-6, a wrench structure in accordance with the preferred embodiment of the present invention comprises a first body unit 10, a second body 20, a third body 30, and an elastic member 40.

The first body unit 10 is a ratchet wrench mechanism and includes a first body 11 and a control knob (or piece or piece) 12.

The first body 11 is a wrench body and is provided with an operation end 111. The operation end 111 has an interior provided with a first pivot portion 112 that is a recess penetrating the operation end 111. The operation end 111 is provided with a first end face 113 having a planar shape. The first body 11 is provided with a second pivot portion 114 that is a slot. The second pivot portion 114 is distant from the first pivot portion 112. The first body 11 is provided with a second end face 115 having a height less than that of the first end face 113. The second pivot portion 114 is situated in the second end face 115.

The first body 11 is provided with two first slide guides (or gears or tracks) 116 spaced from each other. The two first slide guides 116 are located between the first pivot portion 112 and the second pivot portion 114 and extend from the first pivot portion 112 toward the second pivot portion 114. Each of the two first slide guides 116 is an inverted L-shaped elongate piece. The first body 11 is provided with a first receiving recess 117 connected to the first pivot portion 112. The first receiving recess 117 is located between the first pivot portion 112 and the second pivot portion 114 and located between the two first slide guides 116. The two first slide guides 116 are arranged symmetrically relative to the first receiving recess 117. The first receiving recess 117 has a semi-circular shape.

The control knob 12 is pivotally mounted on the second pivot portion 114. The control knob 12 is movable leftward and rightward in the second pivot portion 114 to control normal and reverse rotation of the first body unit 10. The control knob 12 has a top provided with a third end face 121 protruding from the second pivot portion 114. The third end face 121 is flush with the first end face 113 or slightly lower than the first end face 113. The control knob 12 is provided with a control portion 122 movable on the second end face 115.

The second body 20 is pivotally mounted in the first pivot portion 112 and is rotatable relative to the first body 11. The second body 20 is preferably a ratchet wheel. The second body 20 is provided with a first mounting portion 21 that is a polygonal or noncircular recess. The second body 20 is provided with a first limit portion 22 aligning with the first receiving recess 117. The first limit portion 22 is an annular face. The second body 20 has a top provided with a fourth end face 23 having a planar shape. When the second body 20 is received in the first pivot portion 112, the fourth end face 23 and the first end face 113 are located at the same plane. The second body 20 has a periphery provided with a ratchet portion 24 having teeth arranged annularly.

The third body 30 is mounted on the first body 11 and is movable linearly on the first body 11 to be close to or away from the second body 20. The third body 30 is provided with a second limit portion 31 received in the first receiving recess 117. The second limit portion 31 is a protruding block. The third body 30 is provided with two second slide guides 32 movable linearly relative to the two first slide guides 116. The second limit portion 31 is located between the two second slide guides 32. Each of the two second slide guides 32 has a closed first end and an open second end. Each of the two second slide guides 32 is an L-shaped slot and has a shape corresponding to that of each of the two first slide guides 116. The third body 30 is provided with a first abutting face 33 having a planar shape. The first abutting face 33 and the second limit portion 31 are located at the same end. The third body 30 has an end provided with an abutting portion 34 having a concave shape. The third body 30 is provided with a receiving portion 35 formed on the second limit portion 31. The receiving portion 35 is a non-penetrating hole and has an opening directed toward a wall of the first receiving recess 117.

The control portion 122 is driven and moved on the second end face 115. The third body 30 is moved on the first end face 113. The third body 30 and the control knob 12 are situated at different planes. The third body 30 covers the control knob 12 partially. The control knob 12 protrudes from the third body 30.

The second limit portion 31 is restricted by the first limit portion 22, so that the second limit portion 31 is moved in the first receiving recess 117 and will not be detached from the first receiving recess 117. The two second slide guides 32 are restricted by the two first slide guides 116, so that the third body 30 slides on the first end face 113 and will not be detached from the first end face 113.

When the third body 30 is driven and moved relative to the first body 11, the second limit portion 31 is moved away from the first limit portion 22 and moved to contact the wall of the first receiving recess 117, so that the second limit portion 31 limits a maximum distance of displacement of the third body 30. The first abutting face 33 and the abutting portion 34 extend into or retract from the first mounting portion 21.

The elastic member 40 is elastically biased between the third body 30 and the first receiving recess 117 to provide a restoring effect to the third body 30. The elastic member 40 is partially received in the receiving portion 35 and has a first end elastically pressing the receiving portion 35 and a second end elastically pressing the first receiving recess 117. After the second limit portion 31 is moved to contact the wall of the first receiving recess 117, the elastic member 40 is compressed and hidden in the receiving portion 35. The elastic member 40 is a spring.

Figure 5:
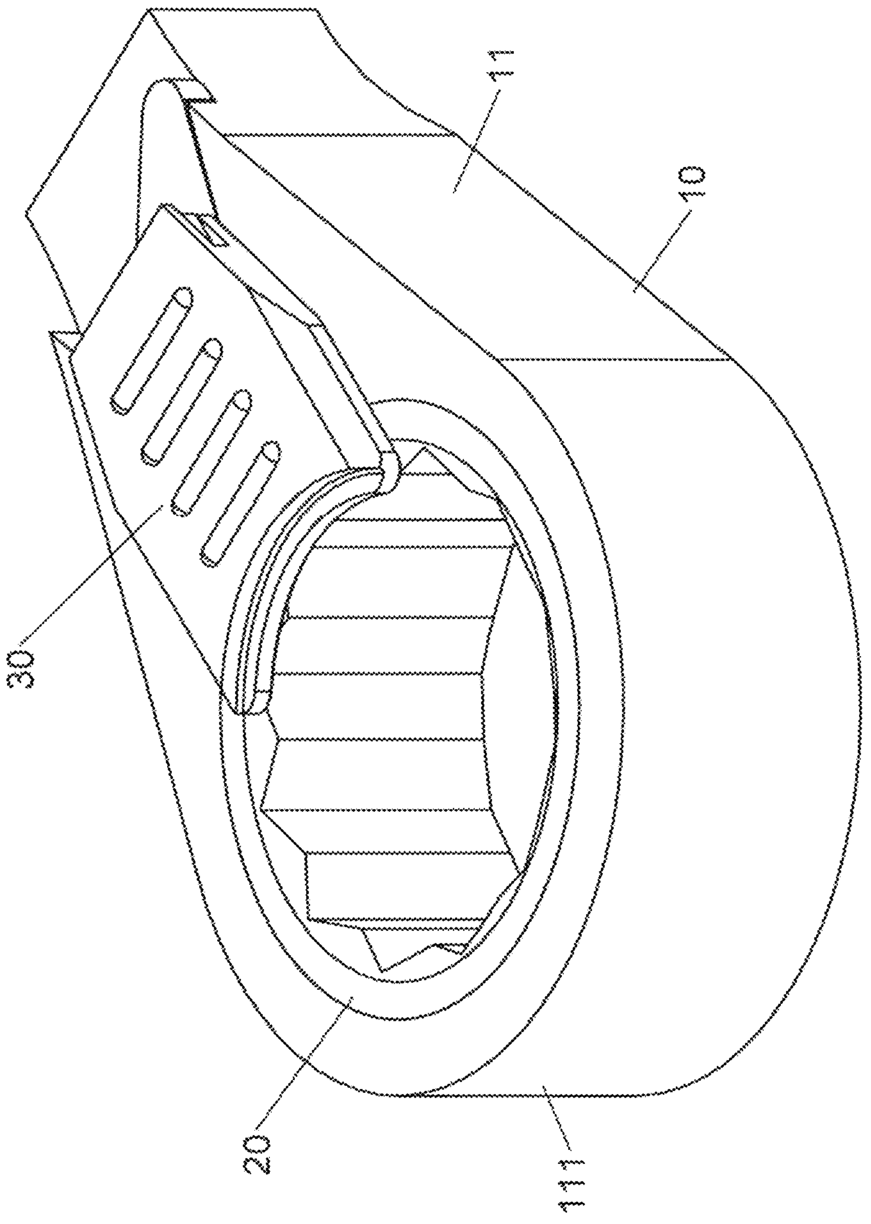
FIG. 5 is a perspective view of the wrench structure in accordance with the preferred embodiment of the present invention.
Figure 6:
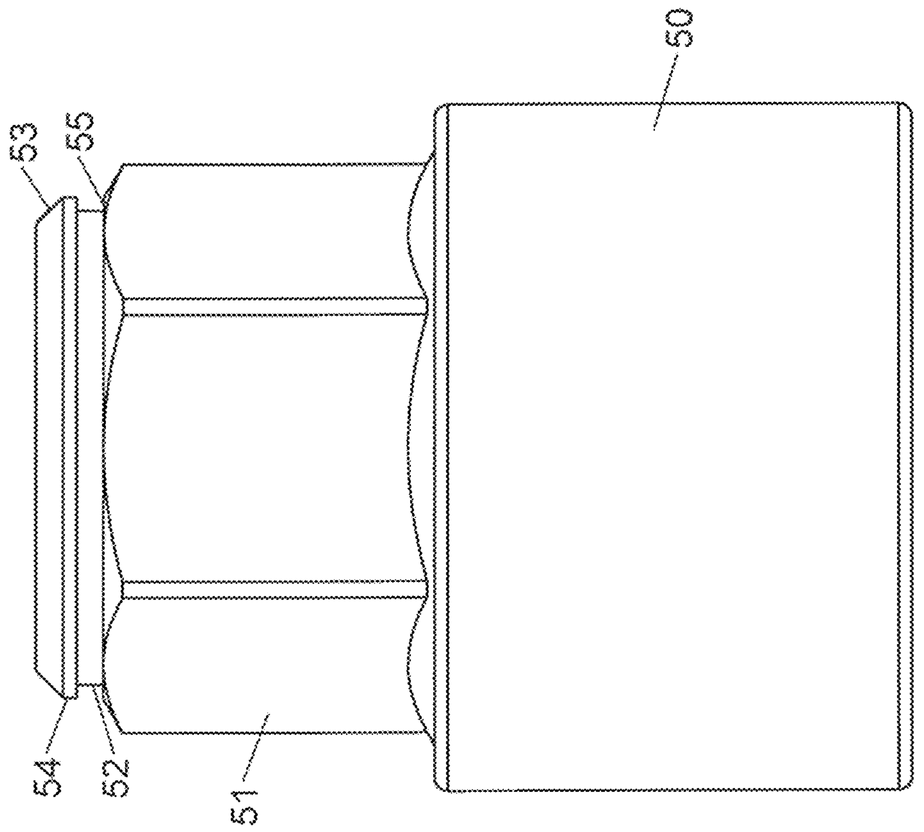
FIG. 6 is a side view of a fourth body of the wrench structure in accordance with the preferred embodiment of the present invention.

Referring to FIG. 5 with reference to FIGS. 1-4, the second body 20 is mounted in the first pivot portion 112, the third body 30 is slidably mounted on the two first slide guides 116, the second limit portion 31 is received in the first receiving recess 117, the elastic member 40 is received in the receiving portion 35 and elastically biased between the receiving portion 35 and the wall of the first receiving recess 117.

The wrench structure further comprises a fourth body 50 that is penetrating hand tool structure or a socket structure. The fourth body 50 is provided with a second mounting portion 51 detachably mounted in the first mounting portion 21. The second mounting portion 51 is a noncircular, hexagonal or polygonal projection. The fourth body 50 is provided with a first annular groove 52 having a concave shape. The fourth body 50 has an end provided with a first inclined face 53. The fourth body 50 is provided with a first peripheral face 54 having a diameter more than that of the first annular groove 52. The first peripheral face 54 has an annular shape. The fourth body 50 is provided with a second abutting face 55. The fourth body 50 is from top to bottom serially provided with the first inclined face 53, the first peripheral face 54, the first annular groove 52, the second abutting face 55, and the second mounting portion 51.

Figure 7:
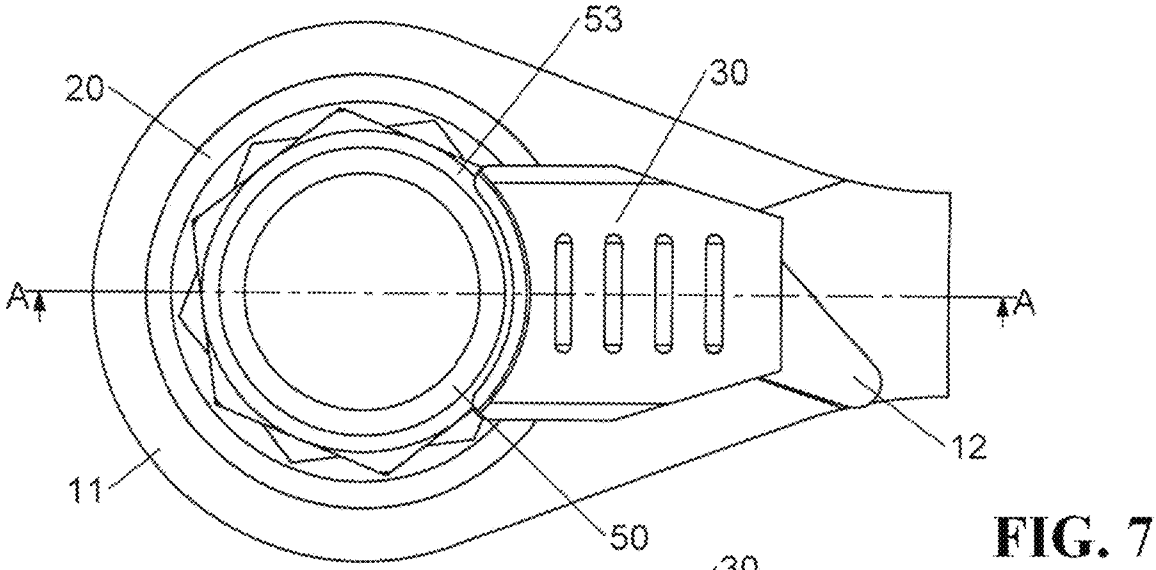
FIG. 7 is a top view of the wrench structure in accordance with the preferred embodiment of the present invention.
Figure 8:
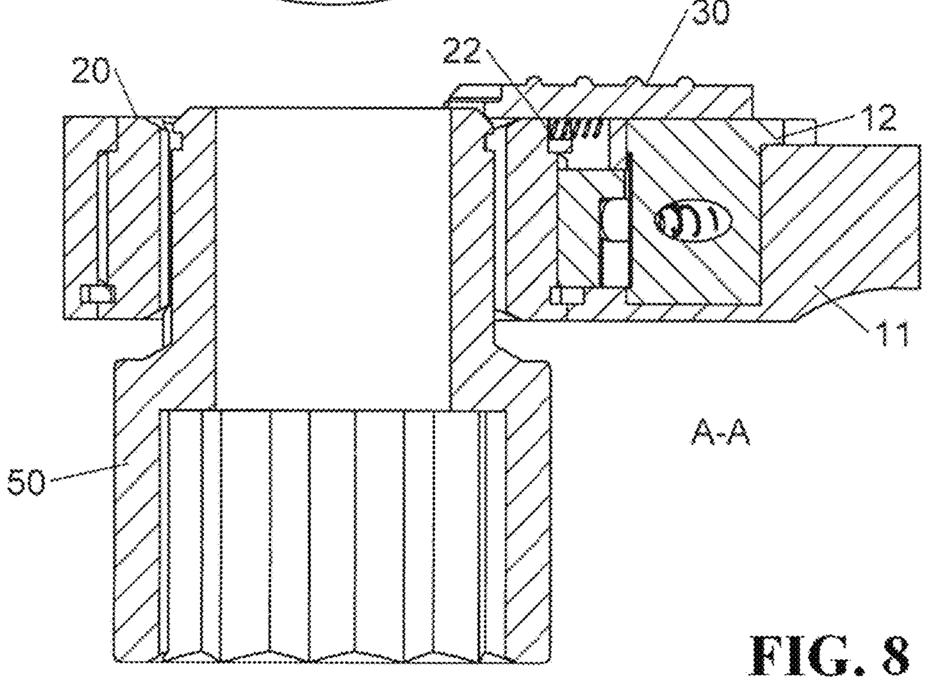
FIG. 8 is a cross-sectional view of the wrench structure taken along line A-A as shown in FIG. 7.

In operation, referring to FIGS. 7 and 8 with reference to FIGS. 1-6, when the fourth body 50 is mounted on the second body 20, the first inclined face 53 is moved upward to touch the abutting portion 34 as shown in FIG. 8.

Figure 9:
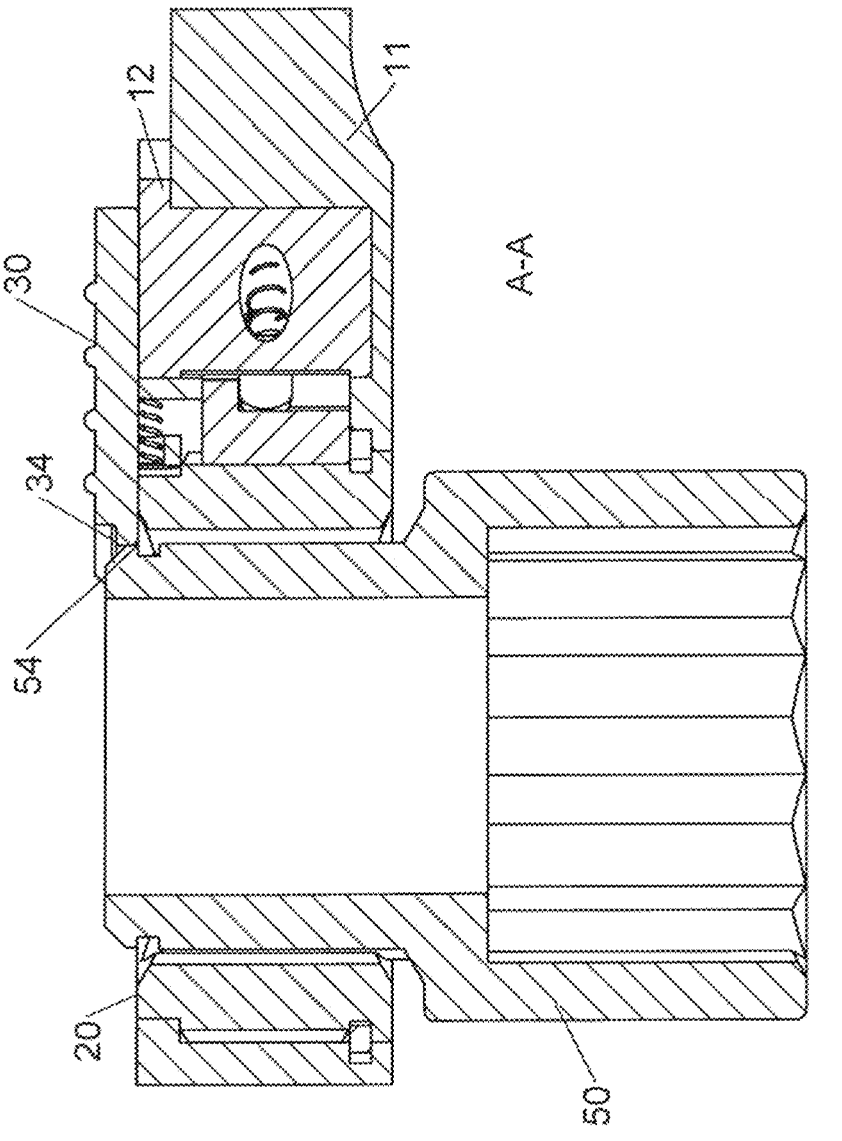
FIG. 9 is a schematic operational view of the wrench structure as shown in FIG. 8.
Figure 10:
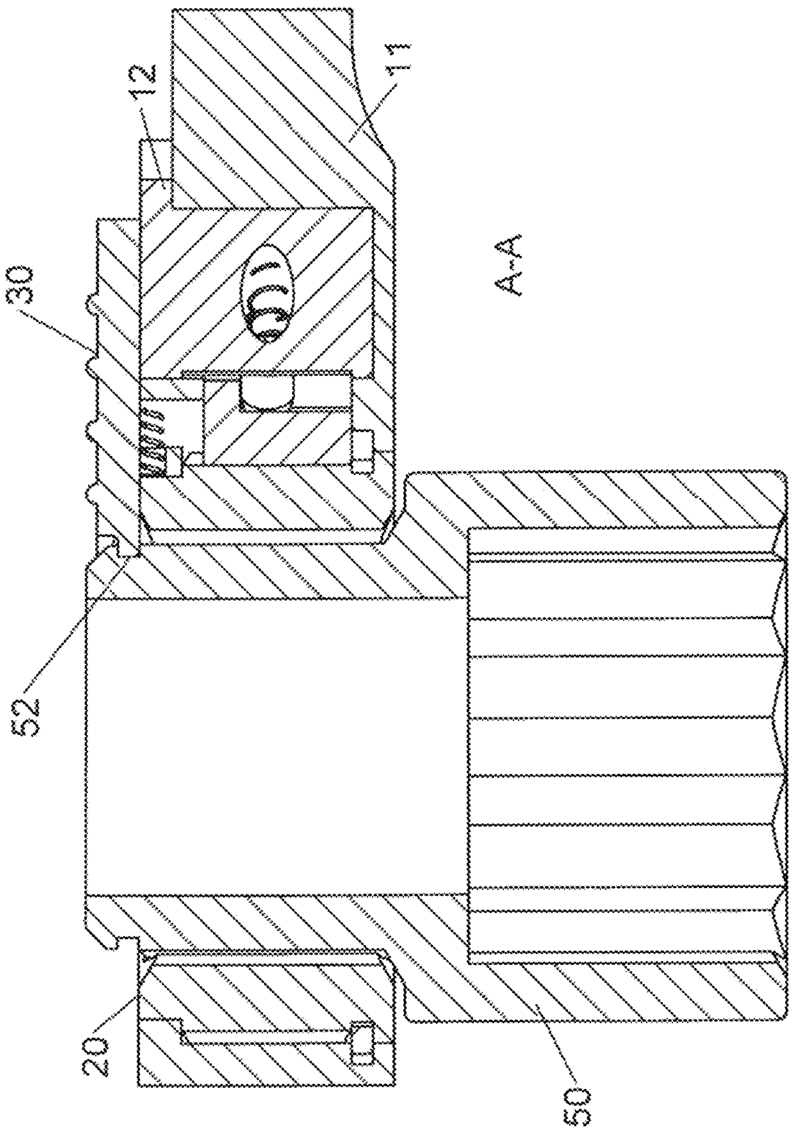
FIG. 10 is a schematic operational view of the wrench structure as shown in FIG. 9.
Figure 11:
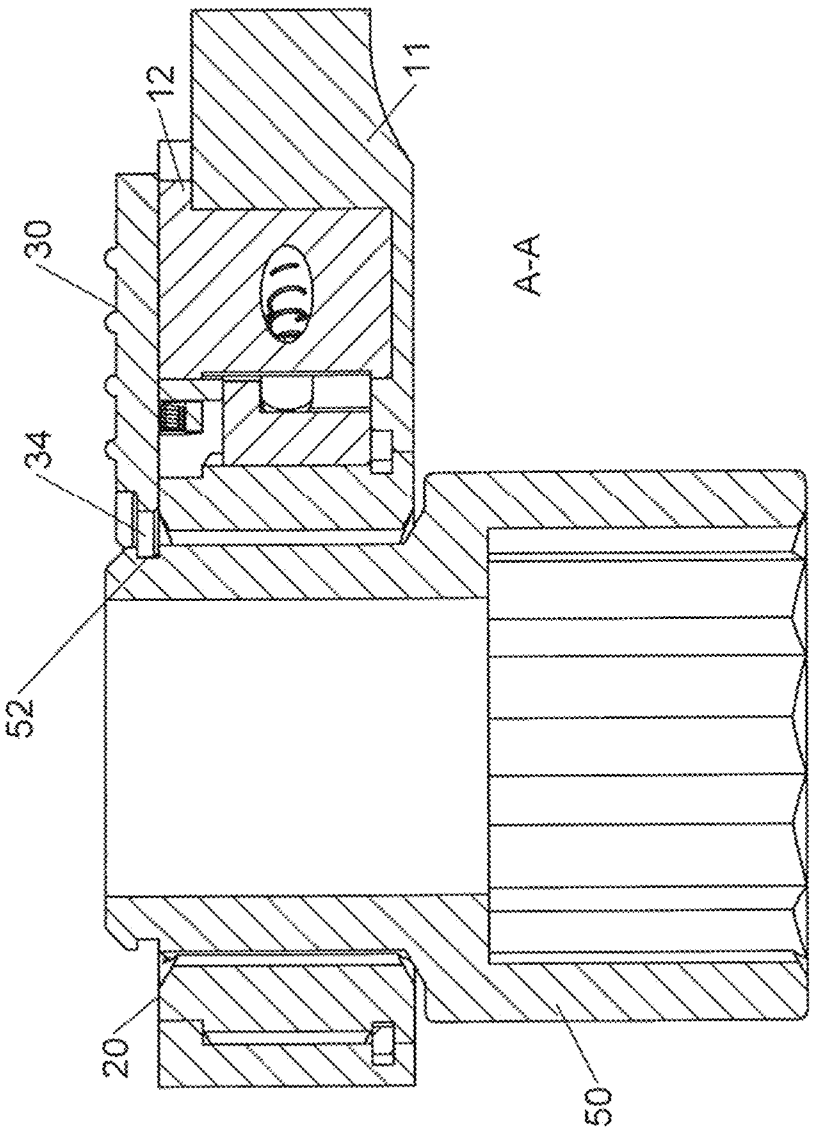
FIG. 11 is a schematic operational view of the wrench structure as shown in FIG. 10.

Referring to FIGS. 9-11 with reference to FIGS. 1-8, when the second mounting portion 51 is inserted into the first mounting portion 21, the first inclined face 53 is further moved upward to push the abutting portion 34, so that the third body 30 is moved toward the control knob 12, and the elastic member 40 is compressed. When the second mounting portion 51 is further moved upward, the first peripheral face 54 aligns with the abutting portion 34 as shown in FIG. 9. When the second mounting portion 51 is further moved upward, the first annular groove 52 aligns with the abutting portion 34. At this time, the third body 30 is pushed by the restoring force of the elastic member 40 and is moved toward the fourth body 50, so that the abutting portion 34 is inserted into and locked in the first annular groove 52 as shown in FIG. 10, the first abutting face 33 presses the second abutting face 55, and the second mounting portion 51 of the fourth body 50 is mounted and locked in the first mounting portion 21 of the second body 20.

When the third body 30 is pushed and moved toward the control knob 12, the elastic member 40 is compressed, the abutting portion 34 is unlocked and detached from the first annular groove 52 as shown in FIG. 11, and the first abutting face 33 is detached from the second abutting face 55, so that the second mounting portion 51 of the fourth body 50 is unlocked and detached from the first mounting portion 21 of the second body 20.

Figure 12:
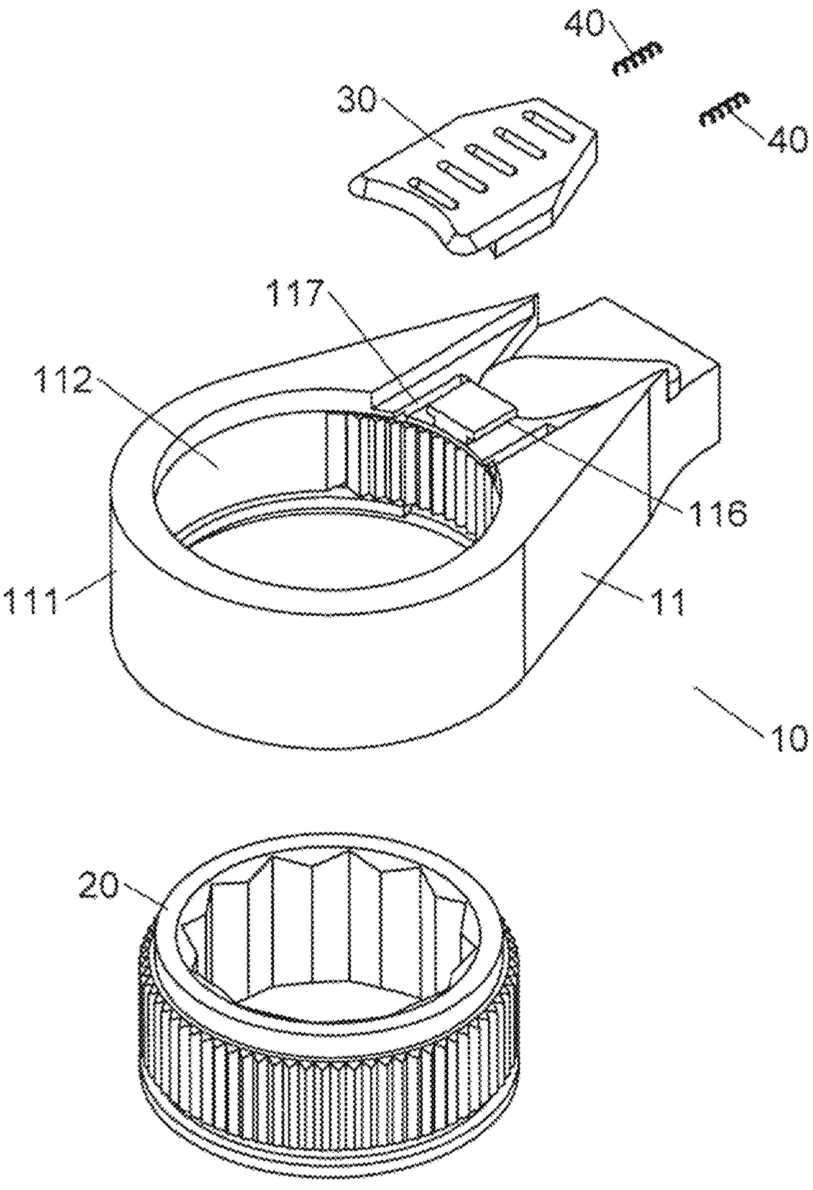
FIG. 12 is a partial exploded perspective view of a wrench structure in accordance with the second preferred embodiment of the present invention.
Figure 13:
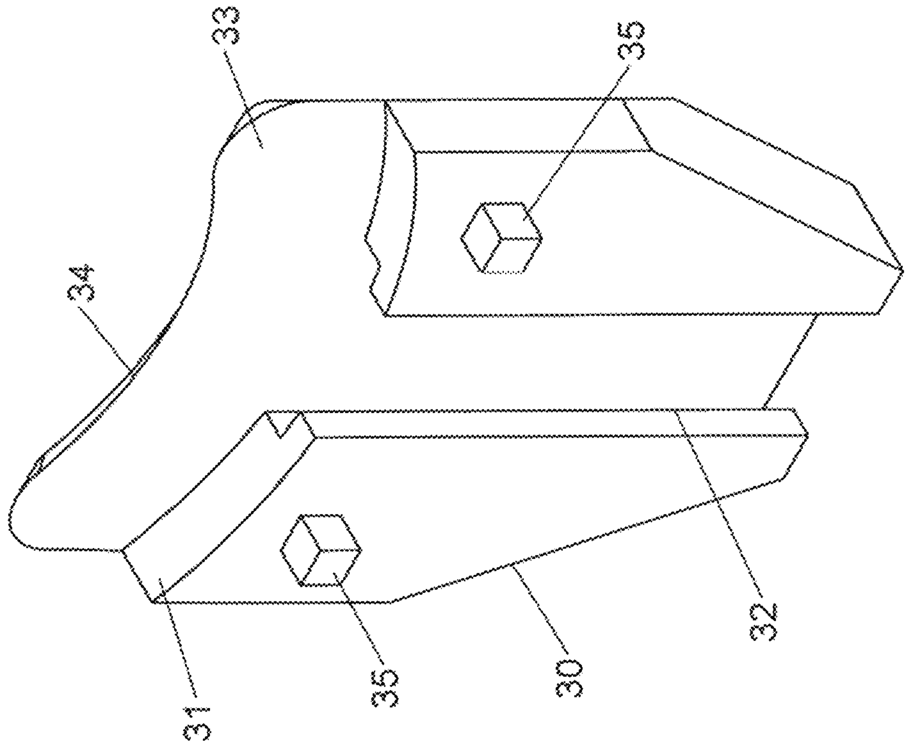
FIG. 13 is a perspective view of a third body of the wrench structure in accordance with the second preferred embodiment of the present invention.

Referring to FIGS. 12 and 13 with reference to FIGS. 1-5, the first body 11 is provided with a first slide guide 116 that is a T-shaped piece. The first body 11 is provided with two first receiving recesses 117 spaced from each other. The first slide guide 116 is located between the two first receiving recesses 117. The third body 30 is provided with a second slide guide 32 that is a T-shaped slot. The third body 30 is provided with two receiving portions 35 spaced from each other. The two receiving portions 35 align with and are received in the two first receiving recesses 117 respectively. The second slide guide 32 is located between the two receiving portions 35. Each of the two receiving portions 35 is a block. The wrench structure comprises two elastic members 40 received in the two first receiving recesses 117. Each of the two elastic members 40 is elastically biased between one of the two receiving portions 35 and a wall of one of the two first receiving recesses 117.

Figure 14:
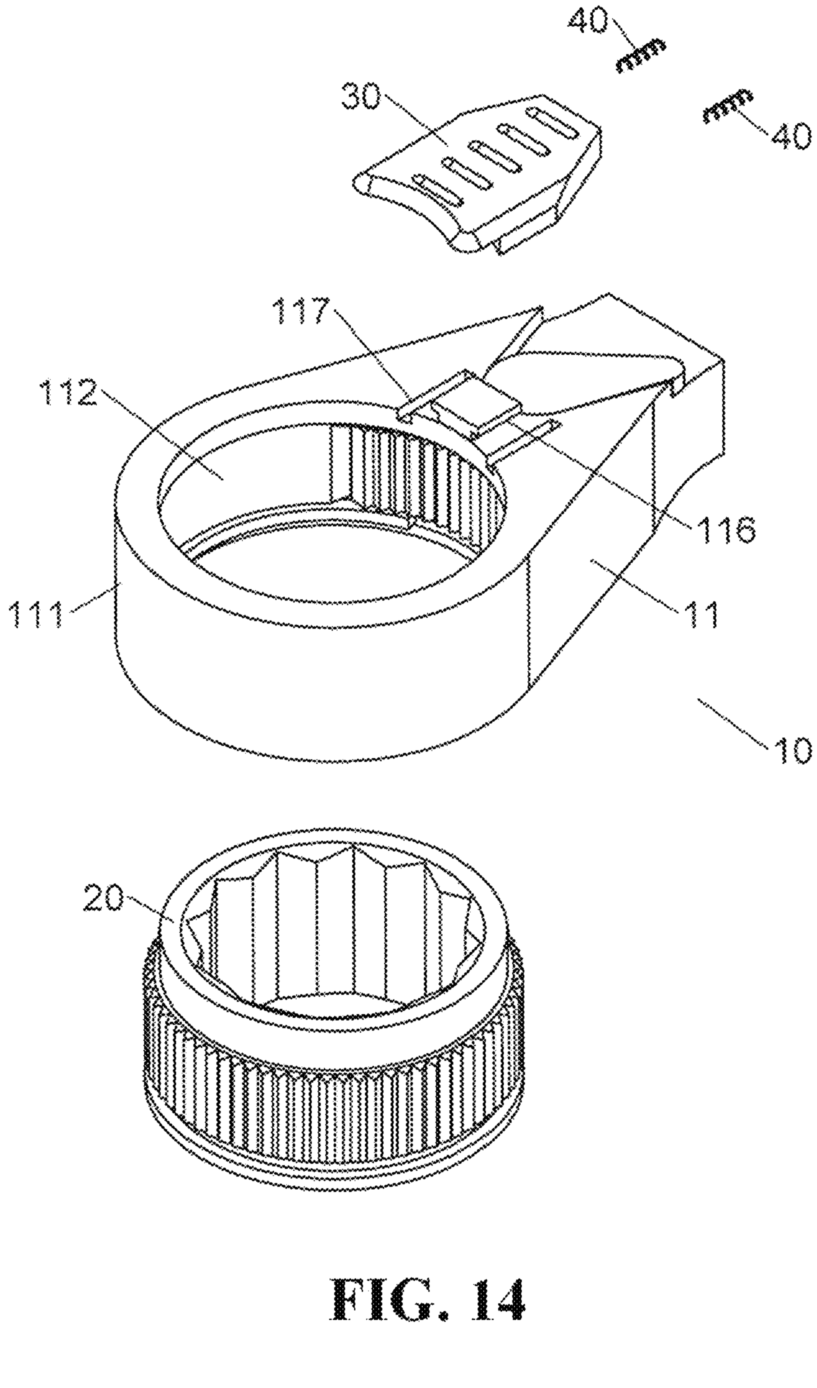
FIG. 14 is a partial exploded perspective view of a wrench structure in accordance with the third preferred embodiment of the present invention.
Figure 15:
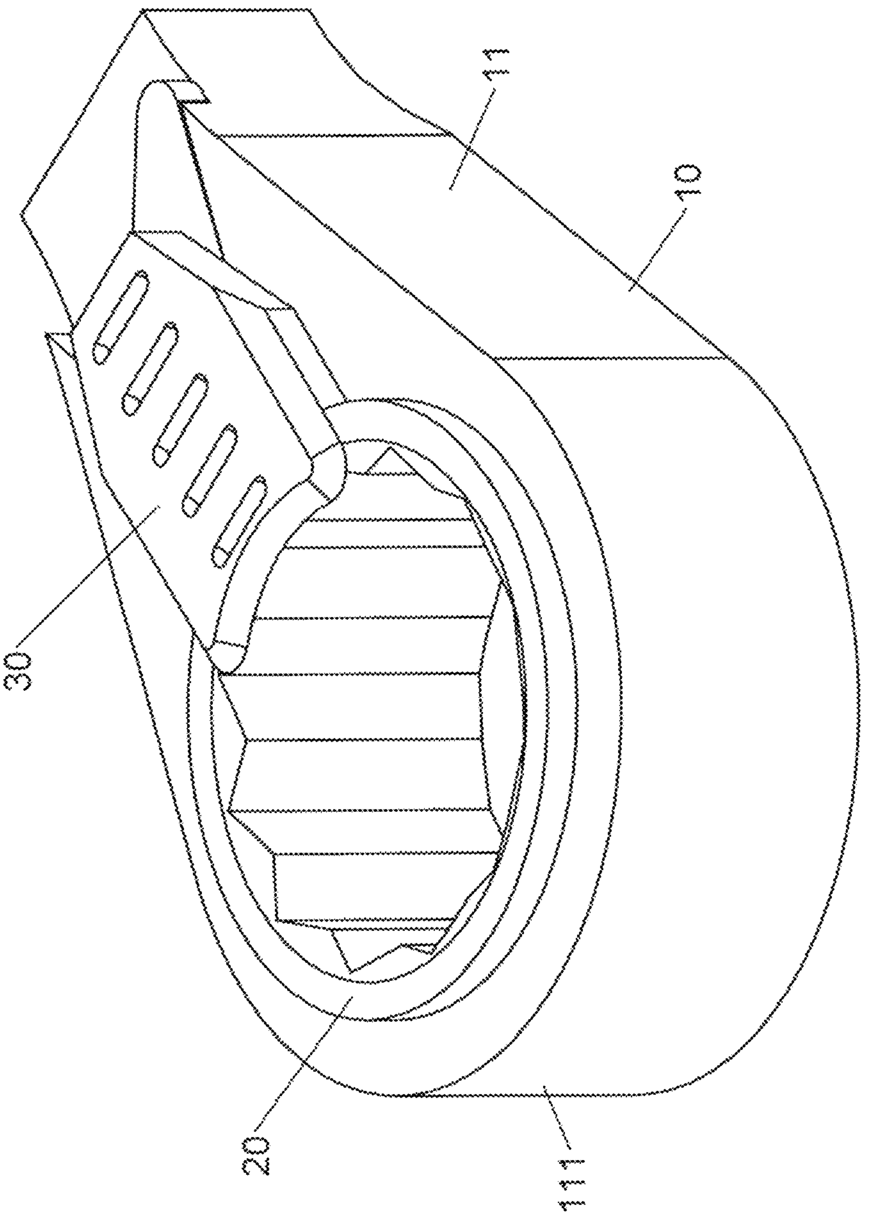
FIG. 15 is a perspective assembly view of the wrench structure in accordance with the third preferred embodiment of the present invention.
Figure 16:
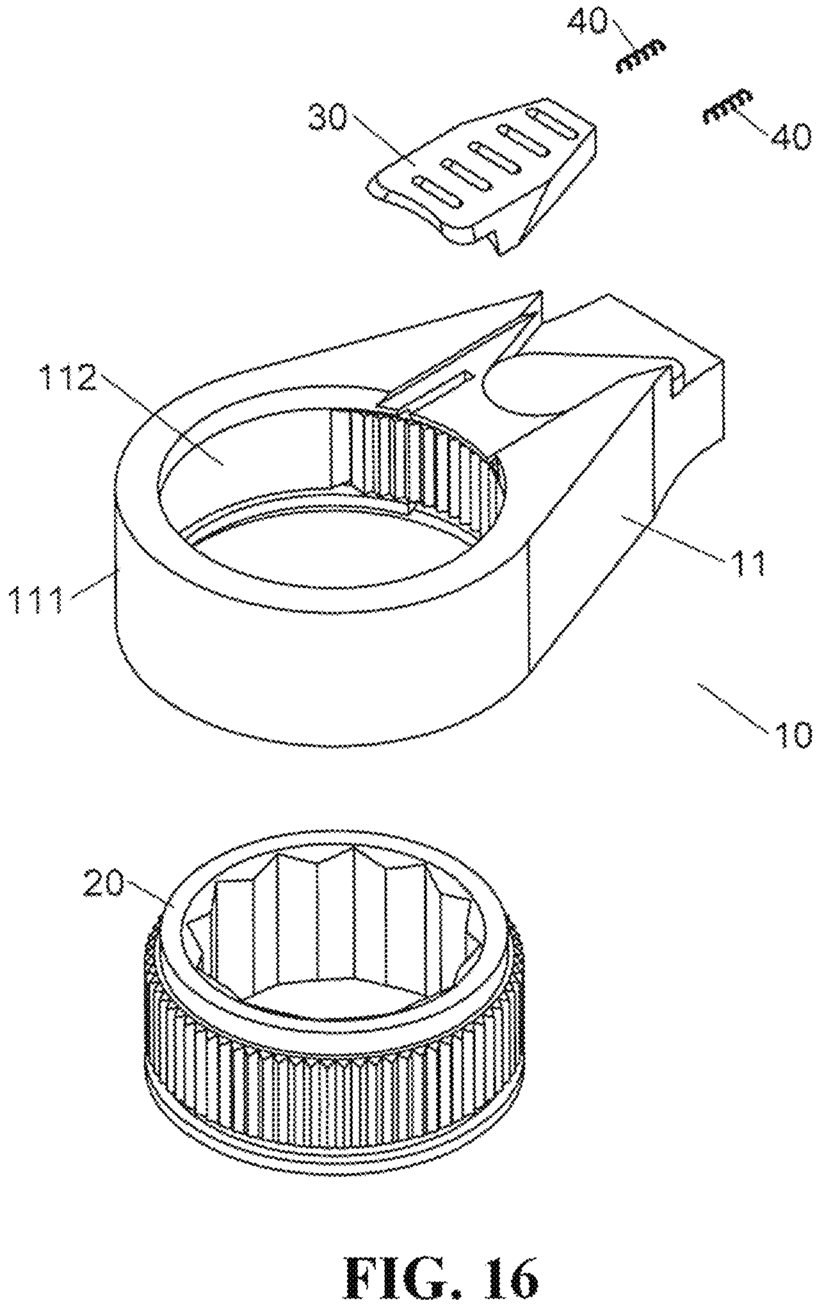
FIG. 16 is a partial exploded perspective view of a wrench structure in accordance with the fourth preferred embodiment of the present invention.
Figure 17:
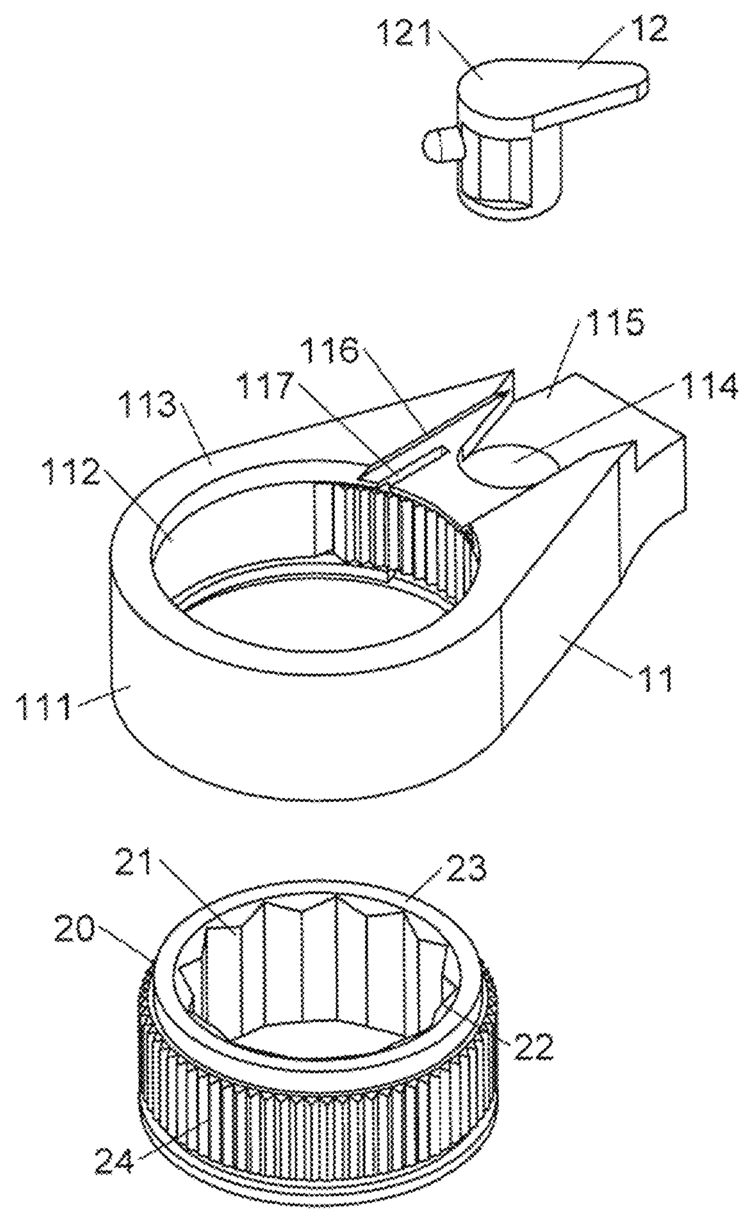
FIG. 17 is a partial exploded perspective view of the wrench structure in accordance with the fourth preferred embodiment of the present invention.
Figure 19:
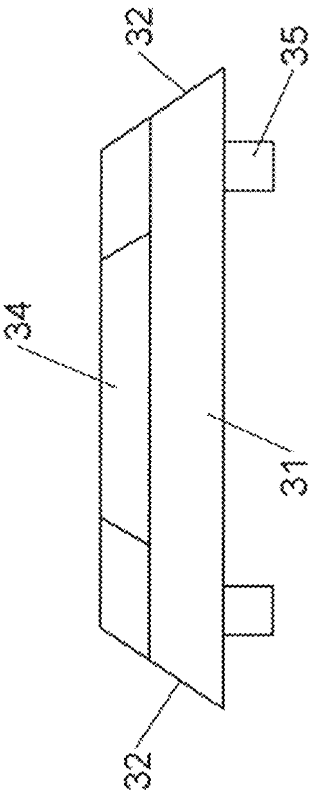
FIG. 19 is a front view of the third body of the wrench structure as shown in FIG. 18.
Figure 18:
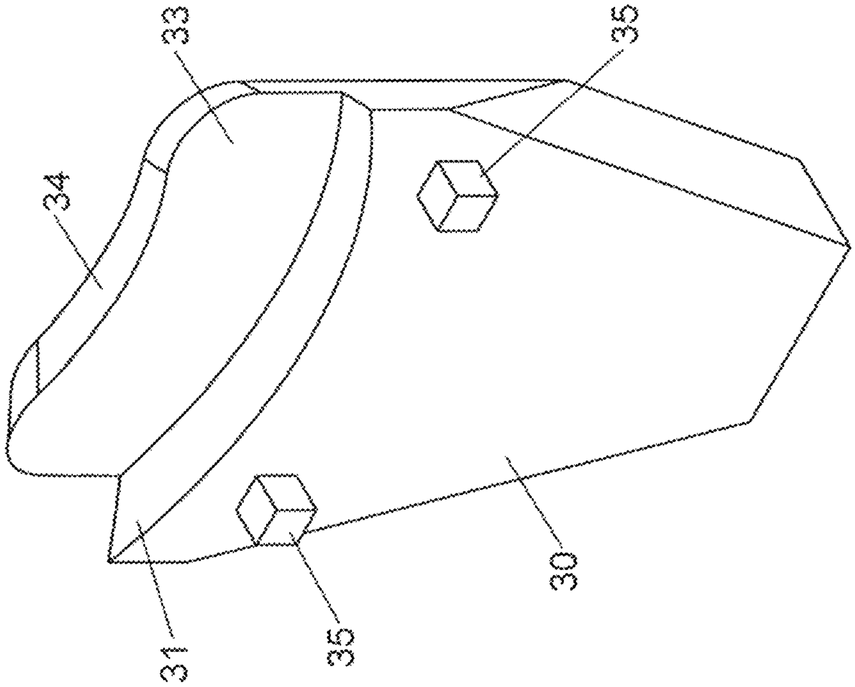
FIG. 18 is a perspective view of a third body of the wrench structure in accordance with the fourth preferred embodiment of the present invention.

Referring to FIGS. 14 and 15 with reference to FIGS. 1-5, the first limit portion 22 and the fourth end face 23 protrude from the first end face 113.

Referring to FIGS. 16-19 with reference to FIGS. 1-5, each of the two first slide guides 116 is an inclined face. The first body 11 is provided with two first receiving recesses 117 spaced from each other and arranged in the two first slide guides 116. Each of the two first receiving recesses 117 is an elongate slot. The two second slide guides 32 are formed on two side edges of the third body 30. The third body 30 is provided with two receiving portions 35 aligning with and received in the two first receiving recesses 117 respectively. Each of the two receiving portions 35 is a block. The wrench structure comprises two elastic members 40 received in the two first receiving recesses 117. Each of the two elastic members 40 is elastically biased between one of the two receiving portions 35 and a wall of one of the two first receiving recesses 117.

Accordingly, the wrench structure of the present invention has the following advantages.

1. The control knob 12 is pivotally mounted on the second pivot portion 114. The third body 30 is provided with two second slide guides 32 movable linearly relative to the two first slide guides 116. The control knob 12 is driven and moved on the second end face 115. The third body 30 is moved on the first end face 113. The third body 30 and the control knob 12 are situated at different planes so that the third body 30 is not interrupted by the control knob 12 during displacement. Thus, the third body 30 and the control knob 12 are controlled and operated individually. The length of the operation end 111 only needs a standard specification so that the operation end 111 only needs a shorter length.
2. The second limit portion 31 is restricted by the first limit portion 22, so that the second limit portion 31 is moved in the first receiving recess 117 and will not be detached from the first receiving recess 117. The two second slide guides 32 are restricted by the two first slide guides 116, so that the third body 30 slides on the first end face 113 and will not be detached from the first end face 113.
3. The two second slide guides 32 are mounted on the two first slide guides 116. The elastic member 40 is partially received in the receiving portion 35 of the second limit portion 31. The second limit portion 31 rests on the first limit portion 22 so that the second limit portion 31 is restricted in the first receiving recess 117 and will not be detached from the first receiving recess 117. Thus, the second limit portion 31 is allowed to move in the first receiving recess 117 and cannot be detached from the first receiving recess 117.
4. When the third body 30 is driven and moved relative to the first body 11, the second limit portion 31 is moved away from the first limit portion 22 and moved to contact the wall of the first receiving recess 117, so that the second limit portion 31 limits the maximum distance of displacement of the third body 30. The first abutting face 33 and the abutting portion 34 extend into or retract from the first mounting portion 21.
5. The third body 30 is a block structure so that the third body 30 is solid and strong and will not be deformed easily.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wrench structure comprising:

a first body unit, a second body, a third body, and an elastic member;

wherein:

the first body unit is a ratchet wrench mechanism and includes a first body and a control knob;

the first body is a wrench body and is provided with an operation end;

the operation end has an interior provided with a first pivot portion that is a recess penetrating the operation end;
the operation end is provided with a first end face having a planar shape;
the first body is provided with a second pivot portion that is a slot;
the second pivot portion is distant from the first pivot portion;
the first body is provided with a second end face having a height less than that of the first end face;
the second pivot portion is situated in the second end face;
the first body is provided with two first slide guides spaced from each other;
the two first slide guides are located between the first pivot portion and the second pivot portion and extend from the first pivot portion toward the second pivot portion;
each of the two first slide guides is an inverted L-shaped elongate piece;
the first body is provided with a first receiving recess connected to the first pivot portion;
the first receiving recess is located between the first pivot portion and the second pivot portion and located between the two first slide guides;
the two first slide guides are arranged symmetrically relative to the first receiving recess;
the first receiving recess has a semi-circular shape;
the control knob is pivotally mounted on the second pivot portion;
the control knob is movable leftward and rightward in the second pivot portion to control normal and reverse rotation of the first body unit;
the control knob has a top provided with a third end face protruding from the second pivot portion;
the third end face is flush with the first end face or lower than the first end face;
the control knob is provided with a control portion movable on the second end face;
the second body is pivotally mounted in the first pivot portion and is rotatable relative to the first body;
the second body is a ratchet wheel;
the second body is provided with a first mounting portion that is a polygonal or noncircular recess;
the second body is provided with a first limit portion aligning with the first receiving recess;
the first limit portion is an annular face;
the second body has a top provided with a fourth end face having a planar shape;
when the second body is received in the first pivot portion, the fourth end face and the first end face are located at the same plane;
the second body has a periphery provided with a ratchet portion having teeth arranged annularly;
the third body is mounted on the first body and is movable linearly on the first body to be close to or away from the second body;
the third body is provided with a second limit portion received in the first receiving recess;
the second limit portion is a protruding block;
the third body is provided with two second slide guides movable linearly relative to the two first slide guides;
the second limit portion is located between the two second slide guides;
each of the two second slide guides has a closed first end and an open second end;
each of the two second slide guides is an L-shaped slot and has a shape corresponding to that of each of the two first slide guides;
the third body is provided with a first abutting face having a planar shape;
the first abutting face and the second limit portion are located at the same end;
the third body has an end provided with an abutting portion having a concave shape;
the third body is provided with a receiving portion formed on the second limit portion;
the receiving portion is a non-penetrating hole and has an opening directed toward a wall of the first receiving recess;
the control portion is driven and moved on the second end face;
the third body is moved on the first end face;
the third body and the control knob are situated at different planes;
the third body covers the control knob partially;
the control knob protrudes from the third body;
the second limit portion is restricted by the first limit portion, so that the second limit portion is moved in the first receiving recess and will not be detached from the first receiving recess;
the two second slide guides are restricted by the two first slide guides, so that the third body slides on the first end face and will not be detached from the first end face;
when the third body is driven and moved relative to the first body, the second limit portion is moved away from the first limit portion and moved to contact the wall of the first receiving recess, so that the second limit portion limits a maximum distance of displacement of the third body;
the first abutting face and the abutting portion extend into or retract from the first mounting portion;
the elastic member is elastically biased between the third body and the first receiving recess to provide a restoring effect to the third body;
the elastic member has a first end elastically pressing the receiving portion and a second end elastically pressing the first receiving recess;
after the second limit portion is moved to contact the wall of the first receiving recess, the elastic member is compressed and hidden in the receiving portion; and
the elastic member is a spring.

2. The wrench structure as claimed in claim 1, further comprising:
a fourth body that is penetrating hand tool structure or a socket structure;
wherein:
the fourth body is provided with a second mounting portion detachably mounted in the first mounting portion;
the second mounting portion is a noncircular, hexagonal or polygonal projection;
the fourth body is provided with a first annular groove having a concave shape;
the fourth body has an end provided with a first inclined face;
the fourth body is provided with a first peripheral face having a diameter more than that of the first annular groove;
the first peripheral face has an annular shape;
the fourth body is provided with a second abutting face; and the fourth body is from top to bottom serially provided with the first inclined face, the first peripheral face, the first annular groove, the second abutting face, and the second mounting portion.

3. The wrench structure as claimed in claim 2, wherein:

when the fourth body is mounted on the second body, the first inclined face is moved upward to touch the abutting portion;

when the second mounting portion is inserted into the first mounting portion, the first inclined face is further moved upward to push the abutting portion, so that the third body is moved toward the control knob, and the elastic member is compressed;

when the second mounting portion is further moved upward, the first peripheral face aligns with the abutting portion;

when the second mounting portion is further moved upward, the third body is pushed by the restoring force of the elastic member, so that the abutting portion is locked in the first annular groove, the first abutting face presses the second abutting face, and the fourth body is mounted in the first mounting portion; and when the third body is pushed and moved toward the control knob, the elastic member is compressed, the abutting portion is detached from the first annular groove, and the first abutting face is detached from the second abutting face, so that the second mounting portion is detached from the first mounting portion.

4. The wrench structure as claimed in claim 1, wherein the first limit portion and the fourth end face protrude from the first end face.

* * * * *